UNITED STATES PATENT OFFICE.

NIELS BREINHOLT BACH, OF MODJOHERTO, JAVA.

PROCESS OF MAKING SUPERIOR SUGAR.

1,104,095.  Specification of Letters Patent.  Patented July 21, 1914.

No Drawing.  Application filed August 4, 1913.  Serial No. 782,903.

*To all whom it may concern:*

Be it known that I, NIELS BREINHOLT BACH, a subject of the Queen of the Netherlands, residing at Modjoherto, Java, have invented certain new and useful Improvements in Processes for Making Superior Sugar; and I do hereby declare the following to be a full, clear, and exact description of the invention, such as will enable others skilled in the art to which it appertains to make and use the same.

In the Tropics sugar-manufacture from cane-sugar is up till now carried out as briefly follows: The so-called raw-juice from cane-sugar mills is first purified by adding lime-milk to it, which is neutralized with carbonic acid or sulfur dioxid after having produced its reaction. According to one or the other of these acids being used, the process is called "carbonatation" or "sulfitation." After treating this so-called thin-juice to neutral reaction it is allowed to settle, after which the "pure-juice" is drained off and the remaining quantity is let to settle a second time. The settled juice, called "dirty-juice" is returned to the raw-juice, while the pure-juice is evaporated until it is reduced to about one fourth of its original volume and let to settle, after which it is sulfited to marked acid reaction and is then fit for further sugar manufacture.

The carbonation- and sulfitation-processes have advantages and drawbacks. The advantage of carbonation is obtaining a whiter, more sugar, notwithstanding the decomposition of glucose taking place with this method. The drawback of this process is the high first costs for acquiring the necessary apparatus.

The invention relates to manufacturing by means of the sulfitation-process superior sugars which are at least as good and as conservable as those obtained by the carbonation-method, without raising the initial or working costs. Different proposals have already been made in this respect and will be briefly mentioned here in order to explain clearly the new process. Up till now the quantity of lime-milk added to the raw-juice for purifying same varied from 6 to 10 liters (15° Bé.) per 1000 liters of juice. This lime-milk is mixed with the juice or, in case of the continuous process, before the sulfiters, the time of reaction being consequently very short. After a two-fold settlement the thin-juice is evaporated to thick-juice which is boiled and allowed to settle in general without the addition of chemicals. This results in a rather light-colored, but dull thick-juice, while nice and conservable sugars require in the first place a clear, sparkling thick-juice.

The proposed improvements related to: 1. Addition of chemicals to the thin-juice or the thick-juice, in order to raise their settling and filtering capacities. 2. Filtration of the thin- and thick-juices. 3. Larger addition of lime. 4. Heating of the juice before or during the sulfitation.

Under step 1. The chemicals added to the juice were generally: for the thin-juice: soluble phosphates, for the thick-juice: phosphoric acid, phosphates or baryte. It seems that the treatment of the thick-juice with phosphoric acid or with phosphates may produce in many cases a thick-juice which is somewhat clearer, part of the finely divided organic substances being carried away by the phosphate of lime. However a much better thick-juice is not obtained, nor is it always possible, to filter successfully the thick-juice treated in this way.

Under step 2. Filtration of the thin-juice in sulfitation-works is not very logical, as upon boiling and concentrating the thin-juice to thick-juice a great quantity of inorganic and principally organic substances not being able to remain any longer in solution will separate therefrom and are very difficult to be settled or filtered. Furthermore filtration of the pure thin-juice is very difficult, the filtered juice being dull and not very much better than the unfiltered pure-juice.

A better result than by the means mentioned under 1 and 2 is obtained by raising the lime-addition as indicated under 3. This results in a more intensive juice-purification and a better settling. The thin-juice as well as the thick-juice are slightly improved thereby, but a clear, sparkling thick-juice is never obtained in sulfitation-works, even by an addition of 12–15 liters of lime per 1000 liters of juice. During the evaporation a precipitation of organic substances always takes place which does not settle down in the thick-juice and cannot be taken away by filtration. Furthermore rather large quantities of the deposit are always carried away when draining off the pure thin-juice, principally of those substances of the thin-juice which settle most difficultly. These substances consequently joint the thick-juice and are extremely difficult to be removed from it by settlement or filtration.

The proposal mentioned under 4 seemed to be important enough to submit it to an exhaustive trial. The result of this examination, which cannot be described in detail, was the following one: Upon heating the juice to 60° C. after the addition of lime a slight decomposition of glucose occurred which is, however, of but little importance for the manufacture of conservable sugars and which can be prevented by heating not before, but during the sulfitation. It is still better to heat the juice before the addition of lime and sulfite it immediately afterward. In this way decomposition of glucose by lime depending more upon the time than upon the temperature does not take place as now highest temperature and highest alkalinity coincide, the juice-purification being, therefore, most intensive. However, the above described methods do not permit of obtaining a perfectly clear and sparkling thick-juice.

Without entering into extraordinarily large and costly lime-additions, filtration of thin-juice and thick-juice gives but little result and a rather large lime-addition (10 liters), combined with heating the juice before adding the lime, constitute merely a means of obtaining a slightly better juice-purification, never resulting, however, in a perfectly clear thick-juice, principally because the juice-purification is not yet intensive enough, but partly too because the clearness of the thick-juice depends on two or three settlements, the last of which generally must be a failure because of the great density of the thick-juice and the low specific weight of the organic substances polluting it. A more intensive juice-purification is only to be obtained by improving the three principal conditions, under which the reaction takes place, namely time, temperature and concentration. At the first sight it seems difficult to give a prescription for purifying cane-juices containing much glucose so that these three factors are utilized as well as possible without obtaining an important decomposition of glucose and darkly colored juices. However, a great number of trials in laboratory and workshop proved that the following new juice-purifying method takes as much as possible into consideration the above mentioned features, which are important for an intensive juice-purification without the onerous glucose-decomposition taking place or any other drawback adhering to this method.

The new process is characterized as follows: Only such a quantity of lime-milk is added to the raw-juice as is required for the neutralization and a good purification and settlement of the raw-juice. The excess quantity of lime-milk which is used in present practice, is only added later on, when the thin-juice has been evaporated to thick-juice. If the thin-juice has a concentration of 4:1 for each 1000 liters of thick-juice four times the remaining quantity per 1000 liters thin-juice will be available, while moreover the juice-concentration and consequently the intensity of the purification are much higher. For instance $2\frac{1}{2}$–4 liters of lime-milk are required for neutralizing 1000 liters of thin-juice, while for a good-settlement generally an excess of 2–3 liters of milklime will do, totaling up to about 6 liters. With the old method, where the whole juice-purification takes place in the preliminary works, a still higher lime-addition is applied in order to obtain at the time less dull thin- and thick-juices, so that in most well-conducted works 8–10 liters of lime-milk or more are added per 1000 liters of juice. According to the new process only 6 liters of lime are e. g. added to the thin-juice for the purification, and easy settlement of the raw-juice, so that a quantity of lime of $(10-6) \times 4 = 16$ liters remains per 1000 liters thick-juice in case the concentration is 4:1.

A number of raw-juice samples, taken in the works and divided into two parts, were treated partly according to the old method, partly according to the new one, in all cases the same quantity of lime-milk being used for both tests. The results of one of these trials, taken at the random in the series, are recorded in the following table. As to the color it is pointed out that this is measured in millimeters of a liquid-column having the same color-effect. A low percentage of lime points to intensive juice-purification.

|  | Liquid-column in millimeters. | Milligrams CaO per liter. |
|---|---|---|
| Thin-juice 1 | 100 | 400 |
| Thin-juice 2 | 90 | 480 |
| Thick-juice 1 | 85 | 1285 |
| Thick-juice 2 | 68 | 1162 |

The numbers prove therefore that an efficient juice-purification is obtained by the new method. The light color and the low lime-percentage of the thick-juice indicate that there is no question about any perceptible glucose-decomposition.

Continued trials have proved that it is to be recommended to add the lime as early as possible to the raw-juice, also for preventing the acidification of the raw-juice, a lighter color and a clearer juice equally resulting therefrom. It is not at all to be feared that the early addition of lime will produce a decomposition of the glucose as has been proved by the trials. On the other hand, thick-juice purification is most efficient, in case lime-milk is added to it at a high temperature and immediately followed by sulfitation. In this case a perceptible glucose-decomposition does not take place, the necessary time failing because of the sulfitation following directly on the lime-addition. The filtration of the thick-juice as obtained by the new method, takes half the time of that of the old process, which directly proves that this juice-purification is a better one. Treating thick-juice with lime also influences favorably the removal of fast color substances, which is very important for the color and conservability of the sugar. The above-mentioned favorable results have been confirmed by applying the new process on a large scale. Treatment at a high temperature has, however, the drawback of alkaline glucose-decomposition preventing the new process from reaching its maximum efficiency. Such glucose-decomposition is more intensive according to the lime-addition or the temperature of the thick-juice being higher, while a temperature above 60° C. is not to be admitted for the above-described process, though this would be very desirable for juice-purification and filtration. At the first sight this seemed to be inevitable as up till now juice-purification in white-sugar works was considered to essentially take place in the following way: Lime-addition neutralizes in the first place the acids of the juice and the excess of lime precipitates more or less perfectly the organic substances of the sugar-juice (color, pectin- and gum-substances) after which the excess of lime is neutralized by $SO_2$ or $CO_2$. The more intensive juice-purification of carbonation works was therefore attributed to the higher alkalinity of the raw-juice after lime-addition and the general conviction was that good juice-purification required a high initial alkalinity of the juice. For this reason larger lime-additions were often used in sulfitation-works and in professional literature it was always indicated that lime should be added at once in order to obtain the advantage of high initial alkalinity. However, the applicant gradually came to the supposition that this theory of juice-purification was not the right one and accurate laboratory-trials confirmed this. Some of these trials will only briefly be mentioned here.

A sample of thick-juice was divided into two equal parts of exactly 0.5 liter. After heating sample 1 to 60° C., 10 cm³ of lime-milk was added and after mixing well the sample was sulfited to neutral reaction with an $SO_2$-solution. For arriving at the neutral point 22.5 cm³ of this $SO_2$-solution were required.

To sample 2 first 22.5 cm³ of $SO_2$-solution were added and afterward 10 cm³ of lime-milk. The reaction of No. 2 after mixing was totally neutral as expected.

The difference between the two samples consisted in the fact that sample 1 had been purified in the ordinary and generally known way, while exactly, the same quantities of lime and $SO_2$ had been added to sample 2 the addition of lime, however, taking place in the latter case after the $SO_2$ addition. Sample 2 never had effectively been alkaline and it was to be expected, therefore, in relation with the above juice-purification theory accepted up till then, that no juice-purification had taken place with this sample. Sample 1 was therefore expected to consist of thick-juice, precipitated organic substances and sulfite of lime, sample 2 on the contrary of thick-juice, the organic substances of which were not precipitated, and sulfite of lime. Investigating into the matter more closely, however, made clear that both samples had been purified one as well as the other, while both had the same light color after filtration, were filtered with the same velocity and contained finally the same quantity of lime too. This was, indeed, very remarkable, considering the totally abnormal way of treating sample 2 with $SO_2$ and lime. The trials were repeated with thick-juice as well as with raw-juice and syrups, always giving the same result, proving that the theory concerning the favorable influence of the maximum juice alkalinity on neutralization is not exact and that juice-purification is more of a physical than of a chemical nature. Precipitating the organic substances therefore takes, probably place in the moment, that lime and $SO_2$ react on each other,—i. e. while the sulfite of lime is in "*statu nascendi*"—, and the more sulfite of lime is formed (in accordance with more lime having been added) the better a juice-purification is obtained while it is totally indifferent if lime or $SO_2$ is added first. This discovery was of great importance for the application of the above-mentioned process, to which as already pointed out, the danger of glucose-decomposition adhered, so that no temperature much above 60° C. could be applied to juice purification. After stating the above-mentioned facts, it was logic to first add $SO_2$ and afterward lime to the thick-juice, so that all glucose-decomposition is excluded, even at temperatures near the boiling-point while the juice-purification becomes a better one. In order to prove again the better juice-purification at high temperatures the above-mentioned trial was repeated while treating, however, sample 2 at a temperature of about 80° C., SO$_2$ and lime being fractionally added in order to prevent alkaline reaction.

The results of the trial were the following:

|  | Color. | Lime per liter. | Filtering capacity. |
| --- | --- | --- | --- |
| Sample 1 | Rather light | 1600 m. Gr | Good. |
| Sample 2 | Lighter than 1. | 1380 m. Gr | Twice as quick as sample 1. |

The same favorable results were obtained by treating raw-juice and syrups.

What I claim as my invention and desire to secure by Letters Patent is:

1. In the method of making white cane sugar, the process which comprises liming and sulfiting the thin juice sufficiently to clarify it, filtering the juice, concentrating the filtrate to thick juice, liming and sulfiting the thick juice and filtering the same.

2. In the method of making white sugar, the process which comprises clarifying thin cane juice by the action of sulfurous acid on lime within the juice, the resulting juice being neutral after said action, and the quantity of lime less than that required for complete liming of the juice, filtering the juice, concentrating the thin juice to thick juice and forming sulfite of lime within the thick juice and filtering the juice, the total quantity of lime for both thin and thick juices being less than the normal quantity of lime required for liming.

In testimony that I claim the foregoing as my invention, I have signed my name in presence of two subscribing witnesses.

NIELS BREINHOLT BACH.

Witnesses:
 N. SCHMIDT,
 T. MEDINA.